US010480703B2

(12) United States Patent
Gamba

(10) Patent No.: US 10,480,703 B2
(45) Date of Patent: Nov. 19, 2019

(54) SLIDING CABLE SAFETY DEVICE FOR CONDUITS OR SIMILAR EQUIPMENTS SUBJECT TO PRESSURE AND CORRESPONDING INSTALLATION INCLUDING SUCH SAFETY DEVICE

(71) Applicant: Davide Gamba, Biella (IT)

(72) Inventor: Davide Gamba, Biella (IT)

(73) Assignee: DAVIDE GAMBA, Biella (IT)

( * ) Notice: Subject to any disclaimer, the term of this patent is extended or adjusted under 35 U.S.C. 154(b) by 32 days.

(21) Appl. No.: 15/770,716

(22) PCT Filed: Oct. 25, 2016

(86) PCT No.: PCT/IT2016/000254
§ 371 (c)(1),
(2) Date: Apr. 24, 2018

(87) PCT Pub. No.: WO2017/072806
PCT Pub. Date: May 4, 2017

(65) Prior Publication Data
US 2019/0063659 A1 Feb. 28, 2019

(30) Foreign Application Priority Data

Oct. 27, 2015 (IT) .......................... 102015000065572

(51) Int. Cl.
*F16L 55/00* (2006.01)
*F16G 11/02* (2006.01)
(Continued)

(52) U.S. Cl.
CPC .......... *F16L 55/005* (2013.01); *F16G 11/025* (2013.01); *F16G 11/14* (2013.01); *F16G 11/146* (2013.01); *F16L 35/00* (2013.01)

(58) Field of Classification Search
CPC ....... F16L 55/005; F16L 35/00; F16G 11/146; F16G 11/025; F16G 11/14; Y10T 24/3916; Y10T 24/314; Y10T 24/3927
See application file for complete search history.

(56) References Cited

U.S. PATENT DOCUMENTS

| 532,242 A | 1/1895 | McShane |
| 2,151,664 A | 3/1939 | Redfield |

(Continued)

FOREIGN PATENT DOCUMENTS

| CH | 693 639 A5 | 11/2003 |
| DE | 3345290 A1 | 6/1985 |

(Continued)

OTHER PUBLICATIONS

Molkow W. et al., "Educational Focus: Elevator Suspension Systems Wire Rope for Elevator Suspension," Elevator World, Elevator World Inc., vol. 51, No. 5, (2003).

(Continued)

*Primary Examiner* — Robert Sandy
*Assistant Examiner* — Rowland Do
(74) *Attorney, Agent, or Firm* — Steinfl + Bruno, LLP

(57) ABSTRACT

A safety device with a sliding cable and a corresponding installation, to secure conduits, pipes, piping and similar equipments subject to high pressure due to fluid under pressure circulating in such conduits and equipments. The safety device includes a flexible cable which forms a first and a second attachment eyelet for attaching and connecting the safety device to two parts of the conduits and equipments under pressure. A first and a second sleeve which close two end portions of the flexible cable form, at the ends of the safety device, the first and second attachment eyelets. Two terminals are provided at the opposite ends of the flexible cable.

20 Claims, 9 Drawing Sheets

(51) Int. Cl.
*F16G 11/14* (2006.01)
*F16L 35/00* (2006.01)

(56) References Cited

U.S. PATENT DOCUMENTS

| | | | |
|---|---|---|---|
| 2,466,083 A | | 4/1949 | Crosby |
| 2,520,325 A | * | 8/1950 | Moore ................ B63B 21/20 403/209 |
| 3,094,755 A | * | 6/1963 | Casanave ............ F16G 11/046 24/129 R |
| 3,235,031 A | | 2/1966 | Cenker |
| 3,490,106 A | * | 1/1970 | Dohmeier ............. F16G 11/02 403/212 |
| 3,757,901 A | | 9/1973 | Hobbs |
| 3,813,733 A | | 6/1974 | Flohr |
| 3,859,692 A | * | 1/1975 | Waterman ............ F16L 55/005 24/300 |
| 3,930,288 A | | 1/1976 | Black et al. |
| 3,997,945 A | | 12/1976 | Robins |
| 4,034,443 A | | 7/1977 | Turner |
| 4,109,603 A | * | 8/1978 | Guthmann ............ B63B 21/00 114/218 |
| 4,317,257 A | | 3/1982 | Engel |
| 4,529,240 A | | 7/1985 | Engel |
| 4,549,332 A | | 10/1985 | Pouliot |
| 4,640,179 A | | 2/1987 | Cameron |
| 4,678,059 A | | 7/1987 | Bowker |
| 4,890,363 A | * | 1/1990 | Cross .................. F16L 55/005 24/129 R |
| 4,912,816 A | * | 4/1990 | Brandt ................. B63B 21/00 114/230.26 |
| 5,137,112 A | | 8/1992 | Nichols |
| 5,269,128 A | | 12/1993 | Walton et al. |
| 5,295,559 A | | 3/1994 | Nutkins |
| 5,379,858 A | | 1/1995 | Sandoval |
| 5,462,019 A | * | 10/1995 | Hong-Rong ............ A01K 1/04 119/795 |
| 5,507,533 A | * | 4/1996 | Mumma ............... F16L 55/005 285/114 |
| 6,330,949 B1 | * | 12/2001 | DeRisio ............... A47F 5/0006 211/113 |
| 6,569,005 B2 | * | 5/2003 | Maxwell .............. A22B 5/161 452/125 |
| D614,018 S | * | 4/2010 | McClanahan ................ D8/356 |
| 7,802,823 B2 | * | 9/2010 | Piantoni ............... F16L 55/005 285/114 |
| 8,050,007 B1 | | 11/2011 | Degurski et al. |
| 8,439,976 B2 | | 5/2013 | Albertorio et al. |
| 8,925,680 B2 | | 1/2015 | Herrli |
| 9,175,437 B2 | | 11/2015 | Gamba |
| 2002/0079164 A1 | | 6/2002 | Choate |
| 2005/0241348 A1 | | 11/2005 | Devecki |
| 2006/0059844 A1 | | 3/2006 | Ely |
| 2007/0261921 A1 | | 11/2007 | Gal et al. |
| 2008/0000719 A1 | | 1/2008 | Jones |
| 2008/0184534 A1 | | 8/2008 | Lara |
| 2010/0101833 A1 | | 4/2010 | Zachariades et al. |
| 2010/0187040 A1 | | 7/2010 | Siemienowicz |
| 2011/0189411 A1 | | 8/2011 | Elad et al. |
| 2012/0067667 A1 | | 3/2012 | Marcoux |
| 2012/0251245 A1 | | 10/2012 | Spearing |
| 2015/0026930 A1 | | 1/2015 | Schmitz |
| 2015/0176678 A1 | | 6/2015 | Burrell |
| 2017/0209721 A1 | | 7/2017 | Gamba |

FOREIGN PATENT DOCUMENTS

| | | |
|---|---|---|
| DE | 202 02 989 U1 | 6/2002 |
| DE | 20 2004 012 456 U1 | 12/2004 |
| DE | 20 2005 011 463 U1 | 9/2005 |
| EP | 0 435 441 A2 | 11/1990 |
| EP | 1 748 104 A1 | 1/2007 |
| EP | 1 891 364 B1 | 2/2008 |
| EP | 2 317 029 A2 | 4/2011 |
| FR | 2 851 924 A1 | 9/2004 |
| FR | 2 950 408 A1 | 3/2011 |
| NL | 1035225 C2 | 10/2009 |
| WO | 2005/028757 A1 | 3/2005 |
| WO | 2007/134746 A1 | 11/2007 |
| WO | 2013/051043 A2 | 4/2013 |
| WO | 2015/189867 A1 | 12/2015 |

OTHER PUBLICATIONS

Non-Final Office Action for U.S. Appl. No. 14/348,856, filed Mar. 31, 2014 on behalf of Davide Gamba. dated Feb. 18, 2015. 10 pages.
Final Office Action for U.S. Appl. No. 14/348,856, filed Mar. 31, 2014 on behalf of Davide Gamba. dated Jun. 5, 2015. 5 pages.
International Search Report for PCT/IT2012/000306 filed on Oct. 3, 2012 in the name of Gamba, Davide. dated Aug. 6, 2013. 8 pages.
Written Opinion for PCT/IT2012/000306 filed on Oct. 3, 2012 in the name of Gamba, Davide. dated Aug. 6, 2013. 13 pages.
International Preliminary Report on Patentability (inclusive of annexes) for PCT/IT2012/000306 filed on Oct. 6, 2012 in the name of Gamba, Davide. dated Jan. 17, 2014. 30 pages.
Restriction Requirement for U.S. Appl. No. 15/328,454, filed Jan. 23, 2017 on behalf of Davide Gamba. dated Jul. 3, 2017. 12 pages.
Non-Final Office Action for U.S. Appl. No. 15/328,454, filed Jan. 23, 2017 on behalf of Davide Gamba. dated Oct. 19, 2017. 15 pages.
Final Office Action for U.S. Appl. No. 15/328,454, filed Jan. 23, 2017 on behalf of Davide Gamba. dated Apr. 16, 2018. 18 pages.
International Search Report and Written Opinion for International Application No. PCT/IT2015/000150 filed Jun. 8, 2015 on behalf of Davide Gamba. dated Nov. 27, 2015. 17 pages.
International Preliminary Report on Patentability for International Application No. PCT/IT2015/000150 filed Jun. 8, 2015 on behalf of Davide Gamba. dated Sep. 28, 2016. 26 pages.
International Search Report for PCT/IT2016/000254 filed Oct. 25, 2016 on behalf of Davide Gamba. dated Mar. 16, 2017. 4 pages.
Written Opinion for PCT/IT2016/000254 filed Oct. 25, 2016 on behalf of Davide Gamba. dated Mar. 16, 2017. 8 pages.
International Preliminary Report on Patentability (inclusive of annexes) for PCT/IT2016/000254 filed Oct. 25, 2016 on behalf of Davide Gamba. dated Jan. 23, 2018. 32 pages.

* cited by examiner

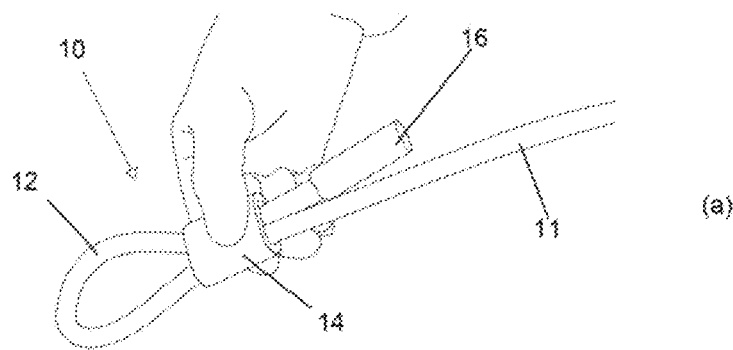
(a)
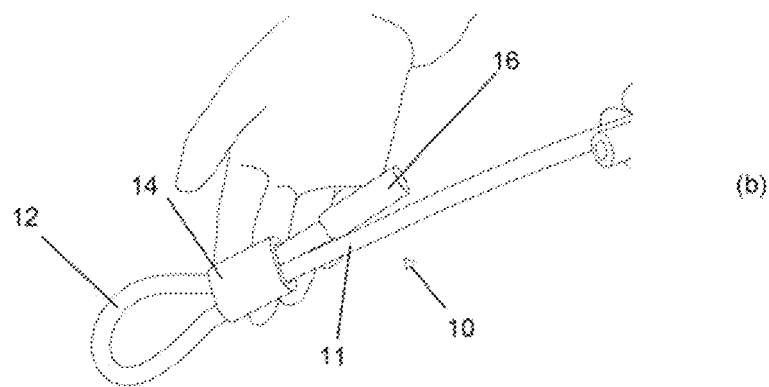
(b)
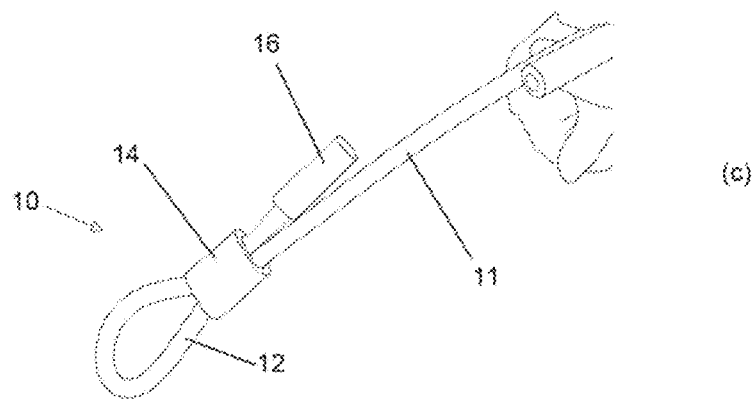
(c)
Fig. 2
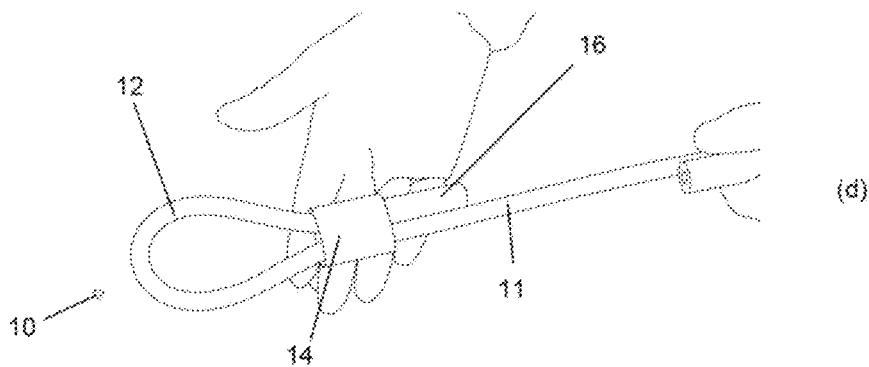
(d)

(a)

(b)

(a)

(b)

(c)

(d)

(e)

(f)

(g)

(h)

SLIDING CABLE SAFETY DEVICE FOR CONDUITS OR SIMILAR EQUIPMENTS SUBJECT TO PRESSURE AND CORRESPONDING INSTALLATION INCLUDING SUCH SAFETY DEVICE

CROSS REFERENCE TO RELATED APPLICATIONS

The present application is the US national stage of International Patent Application PCT/IT2016/000254 filed on Oct. 25, 2016 which, in turn, claims priority to Italian Application No. 10201500065572 filed on Oct. 27, 2015.

FIELD OF THE INVENTION

The present invention relates in general to the field of safety devices whose purpose is to secure conduits, pipelines and piping in pressure, or organs, systems, machinery and similar equipments, such as compressors and hydraulic motors, which are subject in their operating to a high pressure due to the pressure of a fluid that circulates and operates in these conduits, pipelines and similar equipments.

More particularly the invention relates to a new and innovative safety device, of the sliding cable type, adapted to make secure and protect from further damages conduits and pipelines or systems and similar equipments subject to pressure, in the areas in which these conduits, pipelines, systems and equipments under pressure have connections, between the respective parts, which could rupture or burst or be subject in general to troubles because of the pressure and the stresses acting on these connections.

The invention also relates, in a broader sense, to an installation comprising a safety device, with a sliding cable, in order to put in safety a conduit and in general a piping system and an equipment subject in the working to high pressures, in an area where this conduit, piping system and equipment has a connection, and therefore it is subject to the risk of explosion, rupture and faults in such connection area.

Moreover, the invention also relates to a corresponding method for securing conduits and in general piping systems and equipments which are subject in their exercise to high pressures, in the areas where these conduits, systems and equipments under pressure have connections, between the respective parts, that can break and burst due to the pressure of a working fluid flowing in such conduits, systems and equipments.

As it will appear clearly from the following description, the new sliding cable safety device is adapted to effectively remedy some limits and drawbacks of the safety devices and systems, as currently adopted and in use for similar purposes, namely to secure pipes, pipelines, systems, equipments subject to an elevated pressure, in the areas where they have connections.

It follows that the application of the new sliding cable device offers relevant advantages in a variety of circumstances and can be also proposed as a valid alternative to the use of the existing safety systems and devices.

BACKGROUND OF THE INVENTION AND STATE OF THE ART

As it is known, the actual safety regulations require to put in security conduits, ducts, pipelines, systems, machines and similar equipments which are subject in their operation to high pressures and stresses, typically due to the high pressure of a fluid, such as air, oil, water, steam, which is present and circulates in these conduits, pipes, systems, machines and equipments.

Among these regulations there are cited in particular the EN ISO 4413, the BSI and European standards, and the Atex Directive.

In order to comply with these safety regulations, it is known, in the actual technique, to provide and install, in the areas where these conduits, pipes, pipelines, systems, equipments, subject to high pressures, have connections or joints between the respective parts, special safety devices that have the function, in case of breaking, burst, explosion or any other trouble in these connection areas, to retain the parts that constitute these connections.

Therefore, in this way it is prevented, in such event, that the parts of these connections become detached from the other parts and for instance are expelled violently, with the risk of causing further and more severe damages than those already caused by the rupture and the breakage of the conduit, pipe and equipment subject to pressure.

One of these known safety devices, indicated with DS, also often called in the field with the term "whip check", which has had a significant diffusion in the market and which continues to be widely used, is shown by the photographs of FIGS. 6A and 6B.

In particular, with reference to FIG. 6A, this device DS, known, includes a little flexible metal cable or rope, indicated with COR, which form, at the two opposite ends of the device DS, two respective eyelets, in turn indicated with O1 and O2, which are provided to be attached and tightened on two parts, connected to each other, of the conduit, piping or equipment under pressure to be secured by means of the device DS.

A helical spring MOL is fitted externally on the flexible metal cable COR to confer a certain elasticity to the safety device DS and is adapted to cooperate with two guides G1 and G2, within which the cable COR can slide freely, to facilitate the closure and the tightening of the two eyelets O1 and O2 against the two parts of the connection present in the conduit, piping or equipment, under pressure, to be secured by means of the device DS.

Therefore, in the application and use of this known safety device DS, when, due to the pressure of the circulating fluid, a rupture or a burst or an explosion or any other trouble occurs in the connection area between the two parts of the conduit, pipeline and equipment under pressure, to which the safety device DS was attached, these parts are appropriately retained by the device DS.

In this way it is avoided that the rupture or burst of the connection produces further negative effects, in addition to those that are already produced by the breaking or by the explosion itself, and in particular it is avoided that pieces, of the connection that is broken or exploded, are expelled and ejected, which could cause considerable damage and also be dangerous for the people working in the area of these conduits, pipes and equipments under pressure.

For clarity, the photographic images of FIG. 6B—sections (a)÷(d) show how the safety device DS is initially prepared in order to be then attached to a structure or system under pressure to be put in safety.

In particular these photographic images show one of the guides G1 and G2 of the device DS, while it is made to slide manually by an operator along the cable COR in order to adjust the amplitude of the corresponding O1 eyelet, by means of which the safety device DS is subsequently attached to the two parts of the connection present the pressurized system to be secured.

As can be clearly observed from these images, the cable COR of this safety device DS is free to slide in these guides G1, G2, i.e. without the cable COR being subject, while sliding in the guide to adjust the eyelet, to any real and effective force of friction, for example defined by a given calibrated tightening force that is applied by the guide G1 or G2 to the same cable COR.

Also the photographic images of FIG. 6B—section (e)÷(h) show the known safety device DS when it is attached, by mean of its two eyelets O1 and O2, to two parts, indicated with P1 and P2 and constituted in particular by a hydraulic pump and a tube or pipe suitable for conveying fluids under pressure, of a system under pressure to be secured in the connection area between these two parts P1 and P2.

However this safety device or whip check DS, known, has, despite having had a wide use, some drawbacks and limitations that are not negligible and deserve attention in order to remedy them.

In particular, the safety device DS, though having the capability of retaining the two connected parts in case of breakage and/or burst in the area of their connection, does not appear able to provide an effective damping action, i.e. an action capable of dampening efficaciously the energy and high dynamic forces which necessarily are generated when any of these events occurs.

It follows that, in case of breakage and/or burst, the parts of the connection of the pipe or the conduit under pressure, though being put in safety and therefore retained by the security device known DS, are subject, because of the high energy which develops and is released in these critical events, to relevant and strong dynamic and impulsive stresses, often unpredictable, which can cause further and additional damages in the pipe and may even create a dangerous situation for people who work in the vicinity of the pipe under pressure.

For reference, it is also mentioned patent document U.S. Pat. No. 4,317,257 that concerns a device designed to be used, in combination with a suitable traction device, to tear the skin from the carcass of a dead animal.

In particular, this device, known from U.S. Pat. No. 4,317,257, comprises a flexible cable; a pair of sliding sleeves which house and fold the two end portions of the flexible cable so as to form two eyelets; and two terminals or end stops which are fixed to the two ends of the cable to prevent the slipping of these ends from the sleeves.

In use, this device is preliminarily attached at one side, with a respective first eyelet, to a zone of the skin of the carcass of the dead animal and at the other side, with the second eyelet, to the traction device, by sliding the two terminals along the flexible cable of the device so as to tighten the two eyelets respectively on the skin of the animal carcass and the traction device.

Then the traction device is activated so as to pull and strain the flexible cable of the device, and thus tear the skin from the animal carcass.

But this device, usable for skinning the carcass of a dead animal, clearly concerns a technical field which is very far and different from that of the safety devices for piping and equipments in pressure, and correspondingly implies a use which is significantly different and not comparable with that of the safety device, with a sliding cable, proposed by the current invention.

Furthermore, there is still mentioned document US 2015/026930 A1 that relates to a safety device usable for slinging and securing a line, typically constituted by a hydraulic line or pipeline subjected to high pressure by a fluid flowing in it.

In particular this device, known from US 2015/026930 A1, comprises a flexible cable which has an end portion which is closed and bent on itself by means of a closure device, in turn consisting of two threaded sleeves, suitable to be screwed between them, that receive the cable, so as to form an eyelet or loop at an end of the device, while the other end portion of the cable is not bent but is free.

In use, the loop formed by the cable of this safety device is tightened around the pipeline to be secured, by sliding the cable into the closure device and then screwing the respective two sleeves so as to fix firmly the closure device with respect to the cable and therefore prevent any loosening of the loop tightened around the pipeline, while the free end of the cable is fixed to a fixed structure.

Therefore, in case of explosion or trouble in the area of the pipeline, the device acts to retain the exploded pipe through the loop that is tightened around it, so as to avoid further damages.

However this device, known from US 2015/026930 A1, though being specifically provided for securing a pipeline in pressure and preventing further damages in the event of burst of the pipeline, is not free from some limitations and drawbacks that need to be overcome.

For example, this device has a certain cost, since the respective closure device consists of two parts screwed to each other, and consequently also a mounting on the pipeline which is not immediate and rapid, since implying the screwing of the two parts of the closure device to fix the latter to the cable and tighten the loop firmly around the pipeline to be secured.

Furthermore, the fact that the loop of the device is firmly tightened around the pipeline to be secured does not allow a sliding of the cable, in case of intervention of the device for retaining the exploded pipeline, and therefore limits the capacity of the device of absorbing and damping the energy generated by the explosion of the pipeline.

Embodiments of cable safety or security devices designed to secure connections and joints of conduits and pipelines under pressure, by attaching the safety device to two parts, connected to each other, which form the connection to be secured, are also known from U.S. Pat. No. 3,813,733 and EP 1 891 364 B1.

Finally, additional devices, of the type comprising a flexible cable which is bent and closed on itself, at its two end portions, by two corresponding sleeves or clamps which receive the flexible cable, so as to form two eyelets, wherein these two eyelets, formed at the ends of the device, are suitable to be mounted around two generic separated parts for attaching and connecting them together, for various purposes, are described in documents U.S. Pat. No. 4,529,240 and US 532.242.

REFERENCE TO PREVIOUS PATENT APPLICATIONS IN THE NAME OF THE APPLICANT

In the field of the known security devices, with a sliding cable, there are also mentioned for completeness those, though not being provided for a specific use directed to improve security in pipelines and similar equipments under pressure, which are described in the following patent applications in the name of GAMBA, Davide, i.e. of the same applicant of the present patent application:

International patent application PCT/IT2012/000306, published as WO2013/051043 A2, entitled "HIGH-PERFORMANCE COMPOSITE CABLE ROPE AND ANCHORING AND SAFETY SYSTEM INCLUDING SUCH A COMPOSITE CABLE ROPE"; and International patent application PCT/IT2015/000150, published as WO 2015/189867 A1, entitled "SLIDING ROPE SAFETY DEVICE FOR ROOFS AND THE LIKE, CORRESPONDING METHOD FOR DAMPING THE STRESSES ACTING ON A USER OF A ROPE SAFETY DEVICE AND GUARD RAIL WITH A SLIDING ROPE".

Since the international patent application PCT/IT2012/000306, published as WO 2013/051043 A2, describes in detail a special flexible cable, having a central metallic core made of steel wires and at least one textile layer of aramid fibers or kevlar formed around the metallic core, wherein, as described further on, this special cable can advantageously constitute the flexible cable included in the sliding cable safety device of the present invention, the portion of the content of that earlier international patent application PCT/IT2012/000306, published as WO 2013/051043 A2, concerning specifically this special flexible cable with a kevlar layer, is incorporated, in its entirety, for reasons of synthesis, in the present patent application.

SUMMARY OF THE INVENTION

Therefore primary object that the present invention aims to achieve is to propose and provide a new and advantageous safety device, of the cable type, improved with respect to the current ones, suitable to put in security, in accordance with current regulations, conduits, pipelines and in general organs, equipment, plants, machines, for example typically compressors, subject to high pressures, in the areas in which they have connections, between the respective parts, which in critical situations may break and/or burst.

Another object, still related to the previous one, of the present invention is also to provide a cable safety device, adapted to secure connections provided in piping and equipments under pressure, which, in the event of breakage and/or burst and/or explosion of the parts which constitute these connections, in addition to having the capacity to retain these parts, is also adapted to exert an effective damping action of the energy that is generated and released in these events, so as to limit as much as possible the negative effects and the damages that are produced in the same events, as also to eliminate any possible danger to the people working in the area of such piping and equipments under pressure.

A further object, however linked to the previous ones, of the present invention is also to provide a cable safety device suitable for putting in safety connections present in piping and equipments under pressure, which device offers improved performances, a simple construction, an easy and quick assembly and also implies a low cost of manufacture, so as to constitute a valid alternative to the safety devices, currently known, used for similar purposes.

The above objects are achieved by the cable safety device having the characteristics defined by the independent claim 1.

Furthermore particular embodiments of the invention are defined by the dependent claims.

Advantages of the Sliding Cable Safety Device of the Invention

The sliding cable safety device of the invention directed to put in safety pipes and equipments in pressure implies a lot of advantages, in part already before announced, among which there are cited purely in an indicative way of example the following:

an effective damping and dissipation of the energy and the dynamic forces that are generated and are released at the time of breaking and/or explosion in the connection area of the pipe or equipment that is made safe, so as to effectively limit and reduce as much as possible the negative effects and damages caused by the breakage and/or explosion and/or burst;

a simple, immediate and rapid installation of the safety device on the structures and equipments, subject to high pressures during their operation, to be secured;

possibility to adapt, depending on the application in which the sliding cable safety device is used, the capability of the same safety device of damping the energy which is released in case of breakage and/or burst of the structure or the equipment under pressure that is made safe;

a reduced cost of manufacture;

applicability of the device even in environments containing explosive materials and therefore at risk of explosions.

BRIEF DESCRIPTION OF DRAWINGS

These and other objects, features and advantages of the present invention will become clear and evident from the following description of some preferred embodiments and applications of it, made by way of non limitative examples, with reference to the accompanying drawings, in which:

FIG. 2, divided in sections (a)÷(d), is constituted by photographic images showing the safety device of the invention of FIGS. 1A and 1B during a stage of preparation before being applied to an equipment, subject to pressure, to be secured;

Figure 1A:
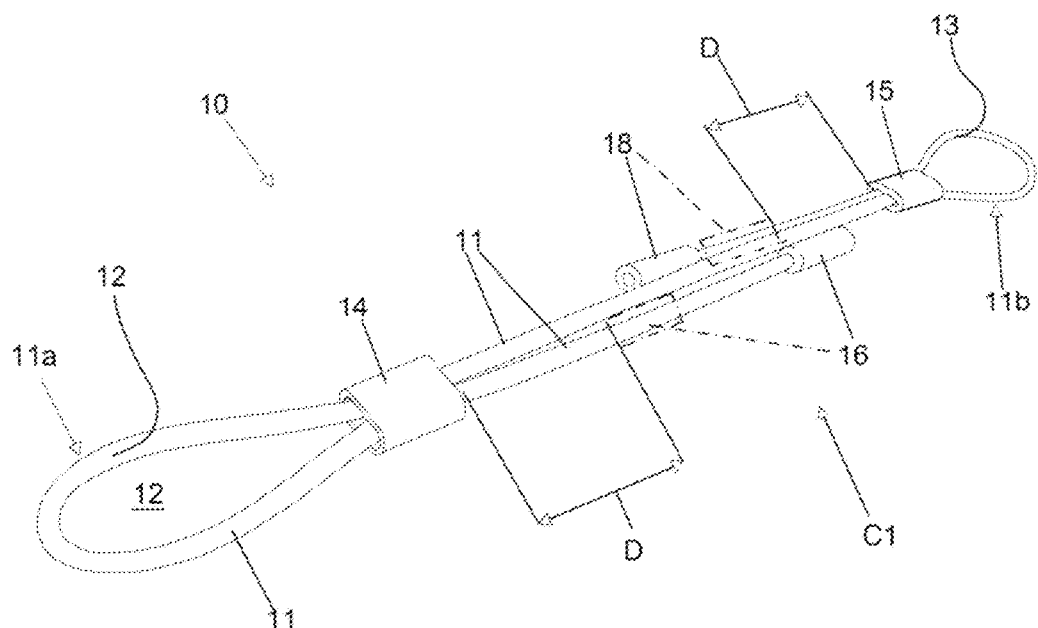
FIGS. 1A and 1B are two photographic images of a sliding cable safety device, according to the present invention, to secure conduits, pipes, or similar systems and equipments subject to high pressures.

DESCRIPTION OF SOME PREFERRED EMBODIMENTS AND APPLICATIONS OF THE SLIDING CABLE SAFETY DEVICE OF THE INVENTION TO SECURE CONDUITS, PIPES AND SIMILAR EQUIPMENTS SUBJECT TO PRESSURE

With reference to the drawings, a sliding cable safety or security device, according to the present invention, to secure conduits, pipes, ducts, organs, elements, systems, equipments, machines, such as compressors, and similar equipments and structures, subject in the operation to very high pressure due to a pressurized fluid, such as air, water, oil, steam which circulates or in general is present and operates in such elements and similar equipments, is indicated in its whole with 10.

In detail, the safety device 10, often also called "whip check" by the people working in the field of the invention, comprises a flexible cable, indicated with 11, which forms with two respective end portions 11a and 11b a first attachment eyelet 12 and a second attachment eyelet 13, wherein these two attachment eyelets 12 and 13, formed by the flexible cable 11, allow to apply and attach the safety device 10, at its two opposite ends, to two elements or parts, generally indicated in the drawings with P1 and P2, which are connected to each other in a respective connection area Z of the conduit, pipe, pipeline, system, equipment or structure, subject to pressure, that is secured by the same device 10.

Therefore the safety device 10 of the invention has to be considered as an essential part of a more general installation, generally indicated with IN in the drawings, including in addition to the safety device 10 also the two specific parts P1 and P2, connected between them in the connection area Z, of the conduit, pipeline and similar equipment under pressure which is secured and made safe by the same safety device 10.

These two parts P1 and P2, connected between them, of the conduit, pipe, structure or the like which is made safe by means of the device 10, can be for example constituted by two tubes in which circulates a fluid, such as air, water or oil, at high pressure, or a tube and a machine such as a compressor or a hydraulic machine, or still other parts and elements subject to a high pressure due to a pressurized fluid circulating or in general operating in these parts.

The safety device 10 further comprises:
a first sleeve or clamp or collar 14 and a second sleeve or clamp or collar 15 which bend and close, in a sliding way as better explained in the following, respectively the two end portions of the flexible cable 11 that form, at the ends of the safety device 10, the first and the second attachment eyelets 12 and 13; and
two terminals, respectively 16 and 18, which are provided at opposite ends, respectively 11a' and 11b', of the flexible cable 11 of the safety device 10.

According to a salient feature of the present invention and as further illustrated below, the safety device 10 is configured in such a way that, when a rupture or a burst or in general a trouble occurs in the connection area between the two parts P1 and P2, subject to pressure, to which the safety device 10 is attached, the flexible cable 11, because of the traction force to which it is subjected as a result of the rupture or fault, is subject to slide in the two sleeves 14 and 15, whereby the two terminals 16, 18 are urged so as to cooperate in contact with the two corresponding sleeves 14 and 15, thereby tightening the two eyelets 12 and 13 of the safety device 10 around the two parts P1 and P2 to which the safety device 10 is attached.

Therefore, advantageously, thanks to the sliding of the flexible cable 11 in the two sleeves 14 and 15 and the consequent tightening of the two eyelets 12, 13 on the two parts P1 and P2, the safety device 10, when intervenes following a breakage or a fault in the connection zone between these two parts P1 and P2, is also suitable to effectively dampen and dissipate the energy and dynamic stresses which develop and are released in such events of breakage and fault.

Advantageously, both the first sleeve 14 and the second sleeve 15 are calibrated, i.e. are constructed so as to close and tighten the flexible cable 11 of the safety device 10, in order to form the two eyelets of attack 12 and 13, with a specific calibrated tightening force, however suitable to allow the sliding of the flexible cable 11 in the two sleeves 14 and 15 in the event of intervention of the safety device 10 following a break or another trouble in the pipeline or equipment in pressure to which the safety device 10 is attached.

In this way, i.e. thanks to this calibrated configuration, the two sleeves 14 and 15 are adapted to control the sliding of the flexible cable 11 in the two sleeves 14 and 15, i.e. to determine and control precisely the friction force that opposes that sliding and consequently also control the degree of damping, applied by the safety device 10, of the energy which develops and is released at the time of a break or in general a trouble in the zone of connection between the two parts, of the structure made safe by the device 10, on which the safety device 10 is installed.

Constructively, the flexible cable 11 of the safety device 10 can be of metallic or non-metallic type, or be constituted by a conventional rope.

It is also possible to realize the flexible cable 11 with tapes or strings, with any type of material.

Also the size of the flexible cable 11 can vary, and for example can be made in various diameters, from 1 mm up to diameters greater than 30 mm.

Moreover, advantageously, the flexible cable 11 can comprise an external covering or layer which covers and isolates it externally and is such as to avoid any rubbing between the ferrous and metallic material of the flexible cable 11 and the metal parts of the conduit, pipe, tubing, system or equipment under pressure to which the safety device 10 is attached.

Therefore, thanks to this external insulating covering, the safety device 10 can be applied, in accordance with regulations, in environments containing explosive and therefore at risk of explosion.

Again, advantageously, the sliding cable 11, included in the safety device 10 of the invention for piping and equipments subject in their exercise to high pressures, can be constituted by the special cable, characterized by an inner core of steel wires, by at least one intermediate layer, formed around the metallic inner core by braided yarns of kevlar, i.e. of aramid fibers, and by a polyester outer layer, which is described in the PCT patent application, already cited previously, PCT/IT2012/000306, in the name of the same applicant, published as WO 2013/051043 A2, and has experimentally shown to have exceptional properties and performance, usable in particular in the field of security.

The two sleeves or collars 14 and 15, within which the flexible cable 11 is able to slide, can be manufactured in various materials such as aluminium, steel, plastic, composite materials, and in various shapes, for example round, flat, oval, others.

FIG. 2, divided in sections (a)÷(d), is a series of photographic images which show the safety device 10 of the invention during a preparation phase before being applied on the structure or equipment, subject to pressure, to be made safe, and which are to be considered self-explanatory so as not to require further comment.

It is only emphasized that these photographic images show how it is possible to manually adjust the amplitude of the two eyelets 12 and 13, formed by the flexible cable 11, through which the device 10 is attached to the pipeline or similar structure in pressure to be put in safety, as also to manually adjust the distance of each of the two terminals 16 and 18, fitted to the heads of the flexible cable 11, from the corresponding sleeves 14 and 15, by sliding the flexible cable 11 in the same sleeves 14 and 15.

The photographic images also show how the two sleeves 14 and 15 have also a guiding function to allow an operator, by sliding the flexible cable 11 in these sleeves 14 and 15, to configure the safety device 10 in the form most appropriate and most suitable for the application to which it is intended.

In use, the safety device 10 is applied on a conduit, a pipe or a similar structure, subject to pressure, to be put in safety, mounting and attaching manually the two eyelets 12 and 13, formed by the flexible cable 11 at the ends of the safety device 10, to two parts, mutually connected in a respective connection area, of this conduit, pipe or structure under pressure to be made safe.

Figure 3:
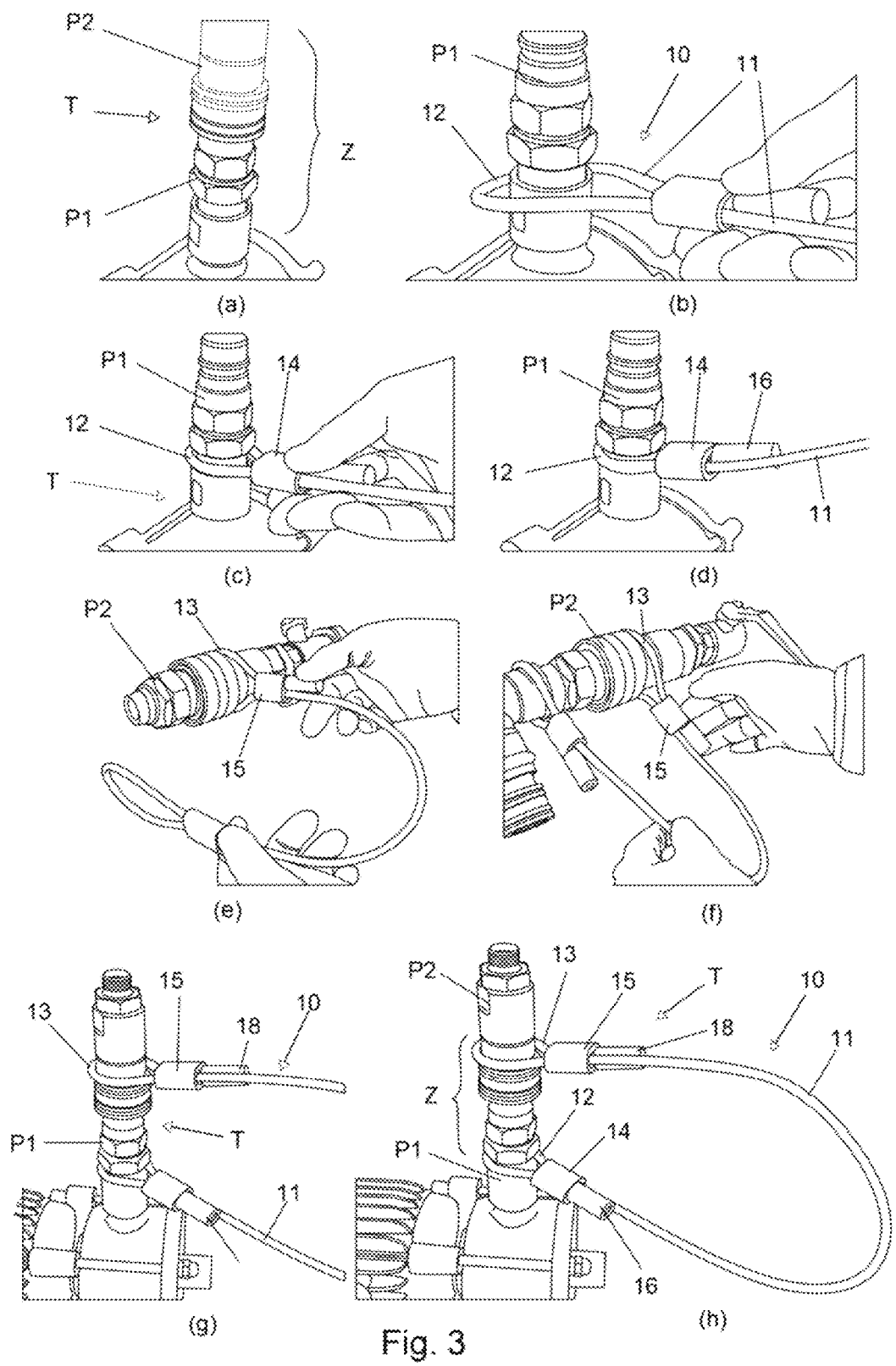
FIG. 3, divided in sections (a)÷(h), is constituted by photographic images showing the safety device of the invention of FIGS. 1A and 1B in the effective use and application to secure two parts connected to each other, in particular constituted by a tube or pipe for a pressurized fluid and a hydraulic pump, which are subject in the working to a high pressure due to a fluid that circulates in these parts connected to each other.

For clarity and by way of example, the photographic images FIG. 3 show justly in sequence the various steps for mounting the safety device 10 of the invention, using the respective two eyelets 12 and 13, on two generic parts P1 and P2, mutually connected in a respective connection zone or area Z, of a pressurized system T to be secured.

In particular, in the photographic example of FIG. 3, these parts P1 and P2, connected between them, are made of a suitable tube for pressurized fluids and a hydraulic pump, and are subject during operation to a high pressure, in the area of their connection, due to the pressure of the fluid, typically oil which circulates in these parts P1 and P2, i.e. in the tube and in the hydraulic pump.

Therefore, when a break or a burst occurs in the connection area Z between the two parts P1 and P2 of the system T under pressure, to which the safety device 10 is attached, the same safety device 10 provides the function of retaining these two parts P1 and P2, in order for example to avoid that, because of the rupture or burst, there are expelled and detached pieces from this connection area, which could create considerable damage and also be very dangerous for the people who is working in the zone of the system under pressure.

Moreover, the flexible cable 11, because of the force and the energy released by the breaking or the blast, is subject to a traction stress that causes a sliding of the flexible cable 11 in the two sleeves 14 and 15 which form and close the two eyelets 12 and 13, so as to push the terminals 16 and 18, fitted to the heads of the flexible cable 11, against and to cooperate in contact of the two sleeves 14 and 15 and therefore tighten the two eyelets 12, 13 on the two parts P1 and P2 to which the device security 10 is attached.

In this way, i.e. by effect of the sliding of the flexible cable 11 in the two sleeves 14 and 15 and the tightening of the two eyelets 12, 13 on the two parts P1 and P1 to which the safety device 10 is attached, the energy and the dynamic stresses that are produced and released because of the break which occurs in the system under pressure are effectively damped and dissipated.

Figure 1B:
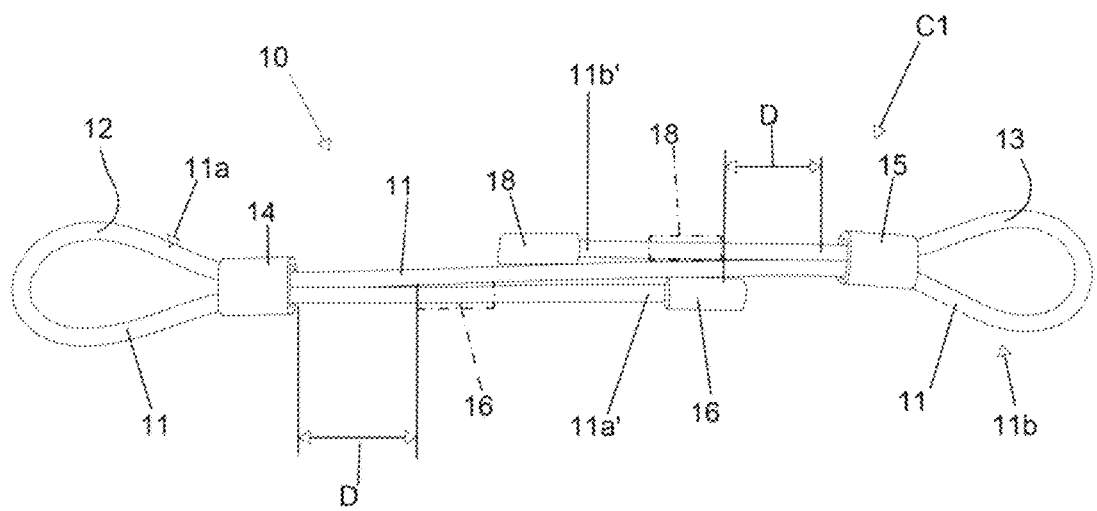

More in detail, according to a preferred form of application, the safety device 10 is applied and mounted on a structure under pressure to be secured, in a configuration, indicated with C1 and shown schematically in FIGS. 1A and 1B, in which the two terminals 16 and 18, arranged at the heads of the flexible cable 11, are suitably spaced apart by a certain distance D from the corresponding sleeves 14, 15 which form the two attachment eyelets 12, 13 used to attach the safety device 10 to the two parts P1 and P2, connected between them, of the structure under pressure to be secured.

In this configuration C1, when a rupture, an explosion or in general a fault occurs in the connection area between the two parts P1 and P2, to which the safety device 10 is attached, thereby causing the detachment of these two parts from each other, the flexible cable 11 is urged to slide in each of the two sleeves 14, 15 because of the force of traction to which it is subjected as a consequence of the break or fault.

This sliding of the flexible cable 11 in the sleeves 14 and 15 in turn determines the recovery, from the two terminals 16, 18 fitted to the heads of flexible cable 11, of the distance D separating initially the terminals 16, 18, in the configuration C1, from the sleeves 14, 15, whereby the two terminals 16 and 18 tend to approach and to stop against the two sleeves 14 and 15.

Therefore, in this application, as shown in FIG. 3, of the safety device 10 of the invention, the distance D at which the two terminals 16 and 18 of the flexible cable 11 are preliminarily adjusted and positioned with respect to the sleeves 14 and 15, other than determining the amount of the sliding of the flexible cable 11 in the two sleeves 14 and 15, plays a fundamental role in determining and controlling the damping, by means of the safety device 10, of the energy that is released when there is a break or a fault in the structure under pressure which is made safe by the same safety device 10.

Figure 5A:
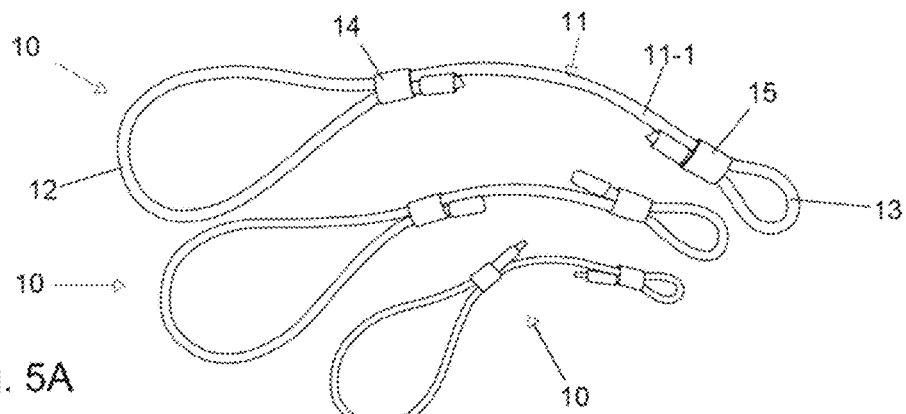
FIGS. 5A-5E are photographic images showing some specimens, of various sizes, types and models, of the sliding cable safety device of the invention.
Figure 5B:
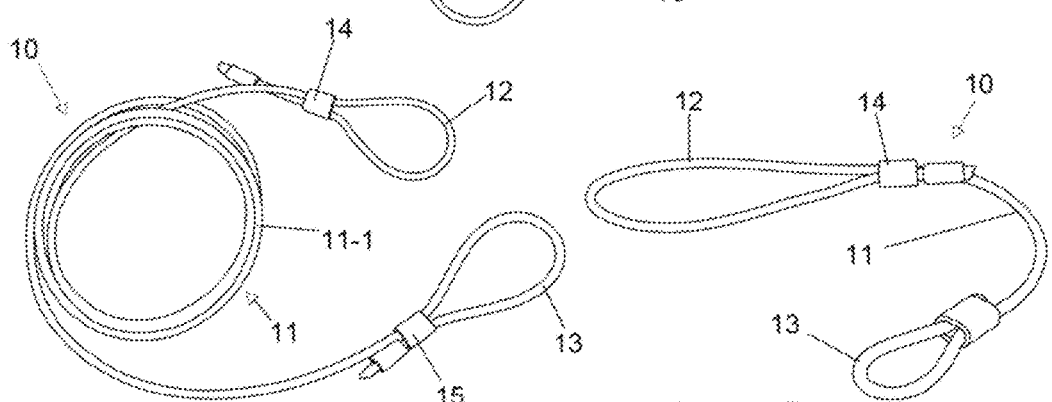
Figure 5C:
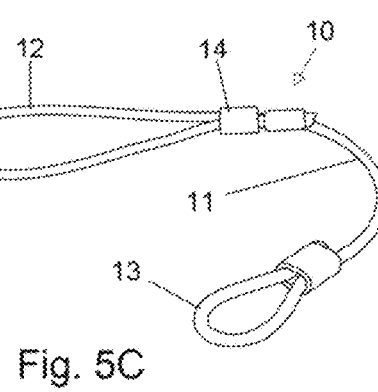
Figure 5D:
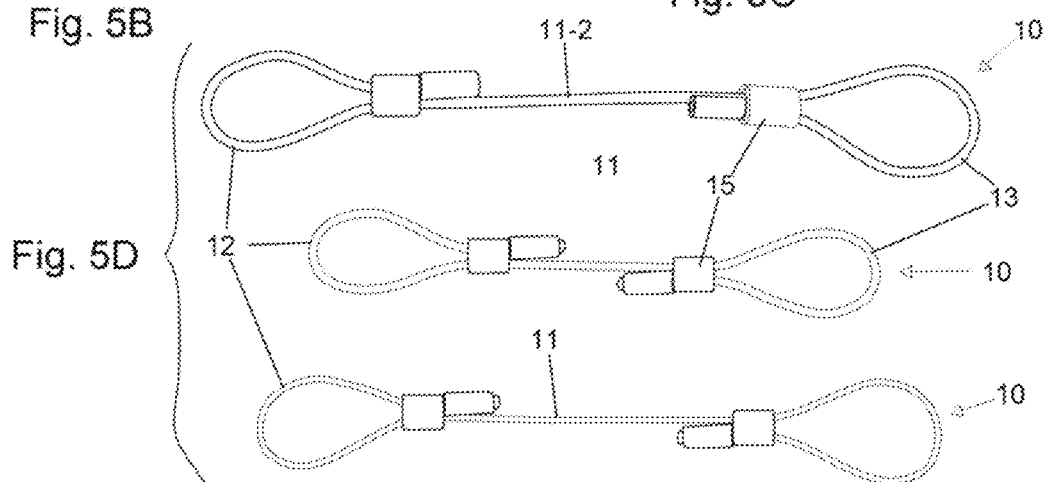
Figure 5E:
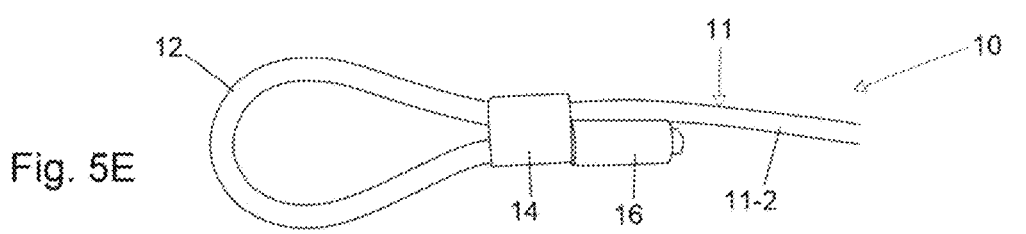
Figure 5F:
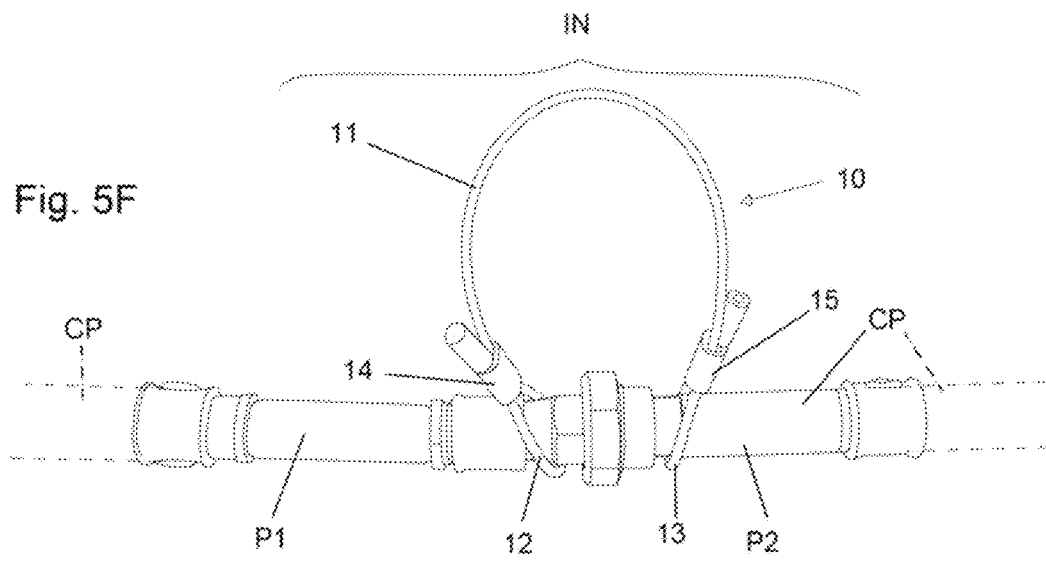
FIG. 5F is a further photographic image showing the safety device of the invention when it is applied on a pipeline under pressure.

In addition to what shown by the photographs of FIG. 3, the photographic image of FIG. 5F shows the security device 10 of the invention when applied on a typical pipeline or tubing under pressure, indicated by CP, in order to secure it.

Furthermore, in order to provide a more complete information, the photographic images FIGS. 5A-5E show some models, of various sizes, and their details, of the sliding cable safety device 10 of the invention, adapted to allow the application of the safety device 10 in a multiplicity of circumstances and operating situations, in order to secure a pipeline or a similar equipment under pressure.

More in detail, the images of FIG. 5A-5C show the safety device 10 in an embodiment in which the respective flexible cable 11 is of the type, indicated at 11-1, with a central inner metal core, an intermediate layer of kevlar, and an outer layer of polyester, in accordance with the special cable protected by the patent application PCT/IT2012/000306, published as WO 2013/051043 A2.

The photographic images of FIGS. 5D and 5E, in turn, show the safety device 10, and the respective details, in one embodiment in which the flexible cable 11 of the device 10 is constituted by a usual metal cable, indicated with 11-2, formed by steel wires.

Tests and Tests Performed on Samples of the Safety Device of the Invention—Sliding or Slipping Test The sliding cable safety device 10 of the present invention has been the subject to numerous and intensive tests in specialized laboratories in order to confirm its innovative features and verify its relevant performances.

Figure 4:
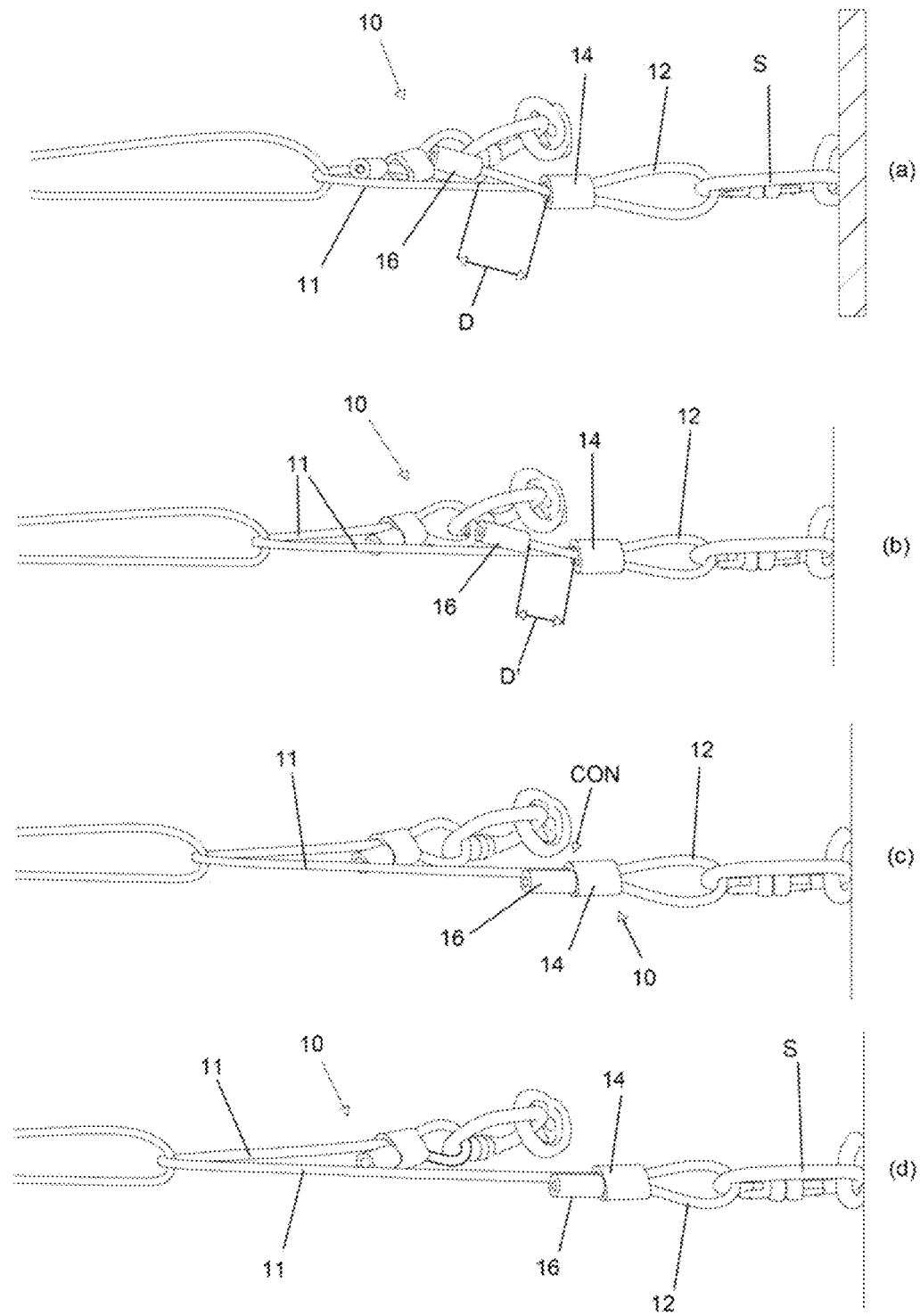
FIG. 4, divided in sections (a)÷(h), is a sequence of photographic images illustrating a sliding test carried out on a specimen of the sliding cable safety device of the invention.
Figure 4:
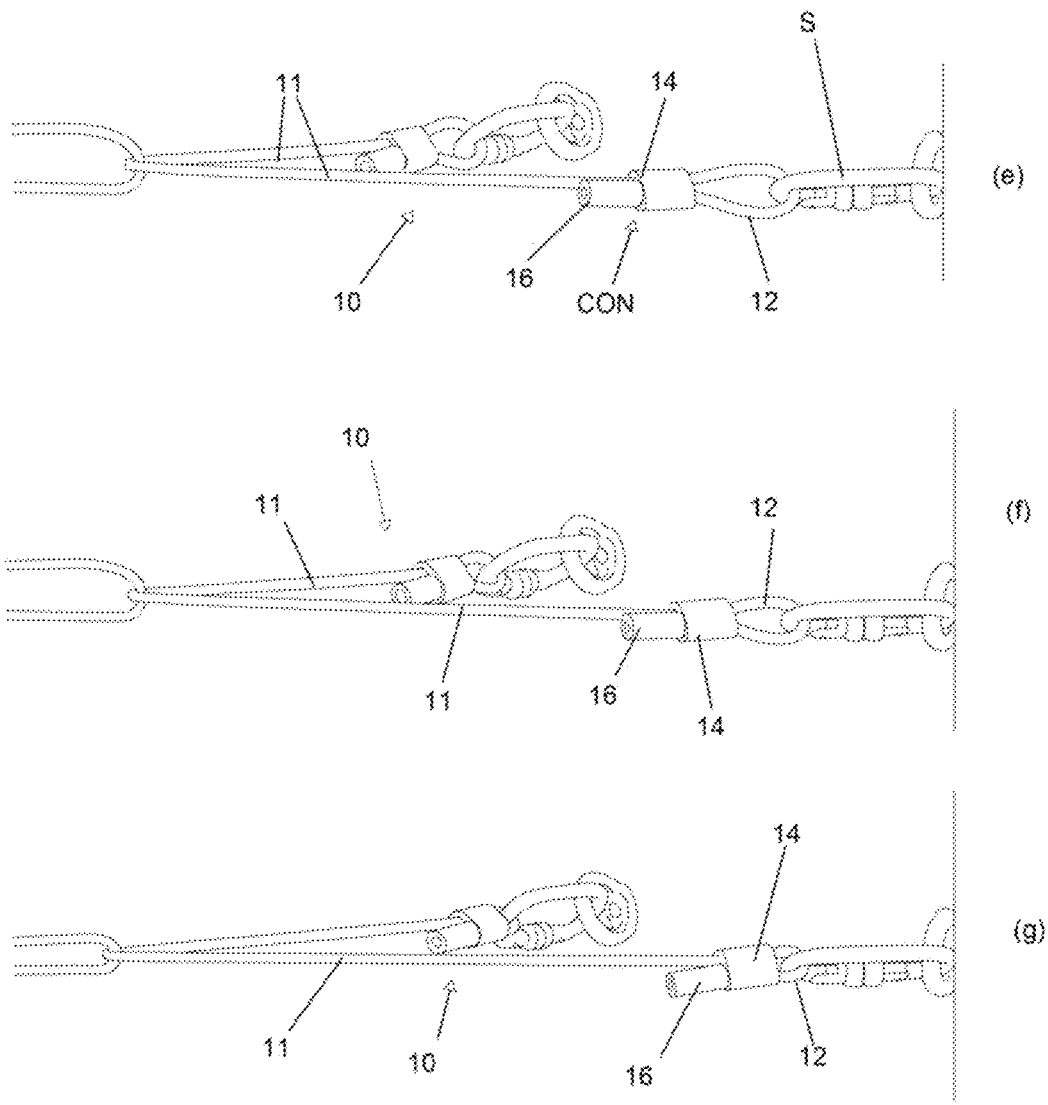

On this regard, the photographic images of FIGS. FIG. 4, divided in sections (a)÷(j), show the various phases of a test, namely a slipping or sliding test, carried out on a specimen of the device 10 of the invention, which has had the purpose of simulating the real operating conditions in which the security device 10 is applied and operates to secure a pipe or a similar structure that is subject in the working to an elevated pressure.

In detail, this sliding test was performed on a specimen of the safety device 10 exhibiting an initial configuration, corresponding to the configuration C1 shown in FIGS. 1A and 1B, in which the two terminals 16 and 18 of the safety device 10 are preliminarily adjusted and positioned at a certain distance D from the sleeves 14 and 15 which close the two eyelets 12 and 13, formed at the end of the device 10.

Therefore this sliding tests, shown in its execution and evolution in FIG. 4, simulates the behaviour of the safety device 10 when it is applied on a pressurized system, in order to secure it, in the configuration C1 schematically shown in FIGS. 1A and 1B, i.e. with the two terminals 16, 18 initially spaced at a certain distance from the two sleeves 14 and 15.

This sliding test shows that during a first test phase, corresponding to the photographic images of FIG. 4—section (a)÷(b), the terminal 16 gradually approaches the sleeve 14, thus reducing the initial distance, i.e. passing from an initial distance D to a shorter distance D', because of the sliding of the flexible cable 11 in the same sleeve 14, in turn caused by the progressive increase of the tensile force, applied to the flexible cable 11 in the test, which simulates and corresponds to the force that is applied in real conditions, i.e. to the traction force that is applied to the flexible cable 11 in the case of breaking or burst of the system under pressure on which the security device 10 of the invention is applied.

Then, at a certain point, as shown by the photographic image of FIG. 4—section (c) and highlighted with an arrow CON, the terminal 16, as effect of the sliding of the flexible cable 11 in the sleeve 14, enters into contact and stops against the sleeve 14.

In the continuation of the test, as shown by the photographs of FIG. 4—section (d)÷(g), with the terminal 16 continuously pressed and pushed against the sleeve 14, the progressive increase of the traction force to which the flexible cable 11 is subjected causes a corresponding progressive tightening of the eyelet 12 on a attachment support S, of the test equipment, to which the specimen of the safety device 10 is attached at one end.

So, once the eyelet 12 is completely tightened and closed on this attachment support S, a further increase of the traction force applied to the flexible cable 11 causes it to rupture, as indicated in FIG. 4—section (h).

It is therefore clear from this test, that the safety device 10 of the invention, to make safe pipes and in general pressurized systems and equipments in the areas where these pipes and pressurized systems have joints and connections between their parts, exhibits special and innovative characteristics and in particular is configured in such a way that, when a rupture, a burst or in general a trouble occurs in the area of such connections, the flexible cable 11 of the safety device 10 is subject to slide in the sleeves 14 and 15 of the device 10 due to the tensile force to which it is necessarily subjected in these circumstances, whereby consequently the two terminals 16, 18, provided at the opposite ends of the flexible cable 11, are forced to cooperate in contact with the two sleeves 14 and 15, so as to tighten the two eyelets 12 and 13 of the safety device 10 around the two sides P1 and P2, of the system in pressure, to which the eyelets 12 and 13 are attached.

In addition, tests have fully confirmed the expectations, and in particular the capability of the sliding cable safety device of the invention to effectively dampen the stresses and the dynamic energy that are generated in case of breakage or similar circumstances.

It is also clear, from the foregoing description and from the experimentation carried out, that the present invention completely fulfills all the scopes which have been previously prefixed, and in particular offers an efficacious sliding cable safety device capable of putting in security systems and equipments subject in their operation to elevated pressures, for example consisting of pipes and machines such as compressors in which a fluid circulates under pressure, as also capable of effectively dampening the dynamic stresses that are produced in the event of breakages and bursts of the connections present in these systems and equipments under pressure.

For integration of the sliding test shown by the photographic images of FIG. 4, there are illustrated in the following the results of some traction and rupture tests carried out, in a certified laboratory, on some samples of the safety device of the invention, in particular of the type with a flexible cable, including an intermediate layer of kevlar, corresponding to the patent application PCT/IT2012/000306, already cited previously.

| Cable type | Flexible cable diameter [mm] | Detected tensile strength [Kg] | Certified breaking load [Kg] |
| --- | --- | --- | --- |
| kevlar + polyester | 4 | 1.435 | 1.143 [11.2 KN] |
| kevlar + polyester | 6 | 3.213 | 2.648 [26 KN] |

In this regard, it is underlined that the numerous trials and tests have confirmed the capability of the safety device of the invention to offer superior performances and remarkable advantages, when the respective flexible cable consists namely of this special cable, described by the patent application PCT/IT2012/000306, with a metal inner core of steel, an intermediate layer of kevlar and an outer layer of polyester.

In particular, this special flexible cable, included in the safety device, is such as that, when the safety device reaches its resistance limit and therefore the inner metal core of the flexible cable breaks, the flexible cable does not break down completely, but maintains a residual strength, whereby the cable breaks completely only after breaking of the metal core, while the other layers of kevlar and polyester intervene to contain the broken metal core and absorb the kinetic energy that is released at the time of the break of the latter.

Therefore, as shown by the tests carried out, it can be stated that the sliding cable device of the invention, thanks to this special cable corresponding to the patent application PCT/IT2012/000306, is designed to offer a double safety, i.e. a first safety directed to hold and retain the parts of the equipment under pressure to which the device is attached, in the event of explosion or another trouble in the connection area between these parts, and a further second safety directed to limit in any case the negative effects produced by the explosion and then to improve the general safety conditions, even when occurring a rupture of the same device and of the respective flexible cable, because of such explosion.

VARIANTS AND FURTHER APPLICATIONS

It is also clear that the sliding cable safety device of the invention can be subject to modifications and variations, regarding both its structure and configuration and the way in which the device is mounted on conduits, pipelines and similar equipments in pressure to be made safe, as well as it can also be applied in a multiplicity of further applications and operative circumstances, with respect to what has been described and illustrated up to here, without thereby departing from the scope of the invention itself.

Figure 5G:
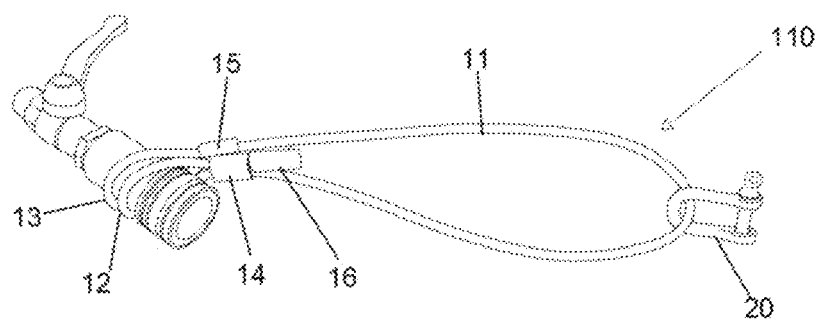
FIG. 5G, divided in sections (a) and (b), is constituted by photographic images showing a first variant of the safety device of the invention, comprising an additional attachment element, associated to the sliding cable of the safety device, for attaching the latter to a pipeline under pressure.
Figure 5G:
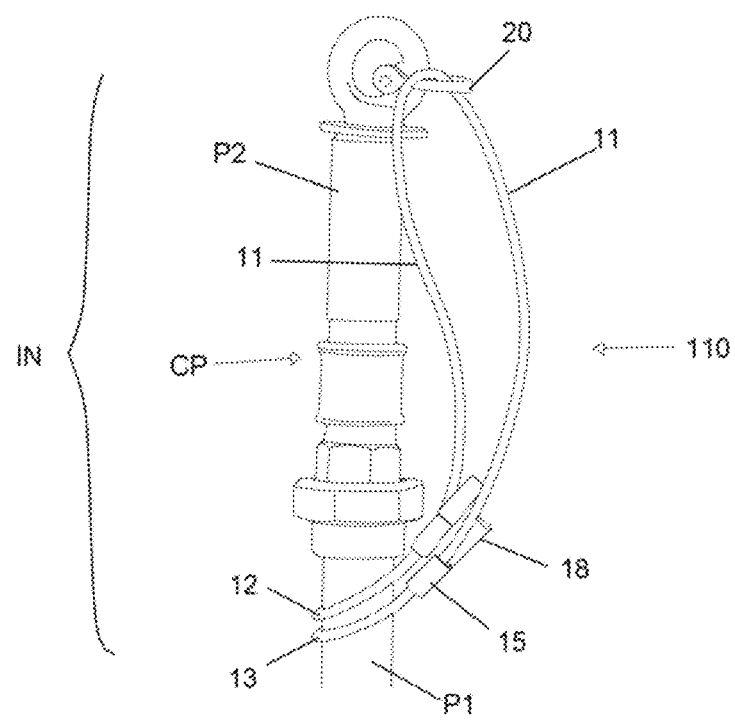

In particular, according to a first variant indicated by 110 and shown in FIG. 5G, the safety device 10 of the invention can be advantageously associated with an additional fastening or attachment element, indicated with 20, capable of allowing to attach the safety device 110 to one of the two parts P1 and P2, connected between them, of pipelines and similar equipments, subject to elevated pressures, to be secured.

In particular, FIG. 5G—section (a) shows in the whole the safety device 110 with the additional attachment element 20 provided and mounted on the flexible cable 11.

FIG. 5G—section (b) in turn shows the safety device 110 when it is actually applied to secure a pressurized pipeline CP, with the first attachment eyelet 12 and the second attachment eyelet 13 of the device 110 which are mounted and attached to a same side P1 of the pipeline CP under pressure, and with the flexible cable 11 of the device 110 which is attached, via the additional fastening element 20, to the other part P2 of the pressurized pipeline, along the portion of the flexible cable 11 extending between the two eyelets 12 and 13.

Figure 5H:
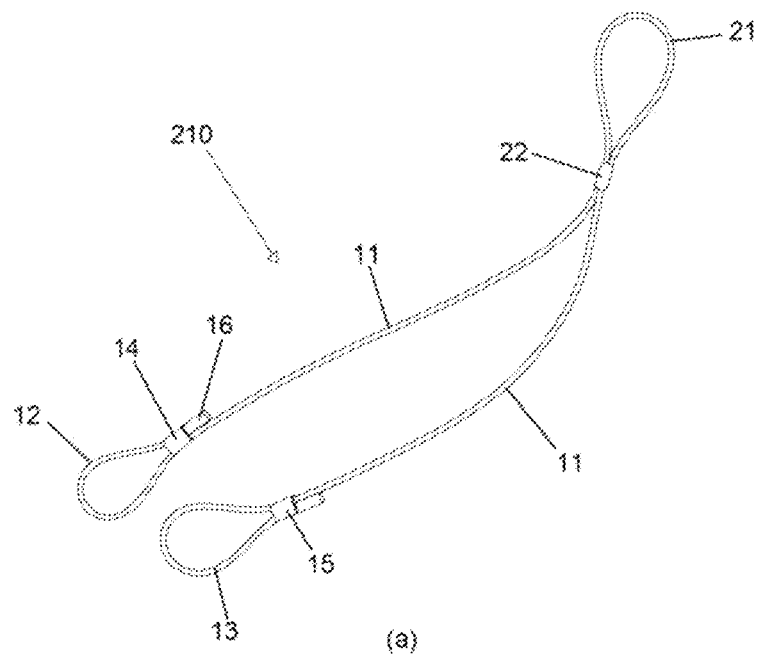
FIG. 5H, divided in sections (a) and (b), is constituted by photographic images showing a second variant, with three attachment eyelets, of the safety device of the invention.
Figure 5H:
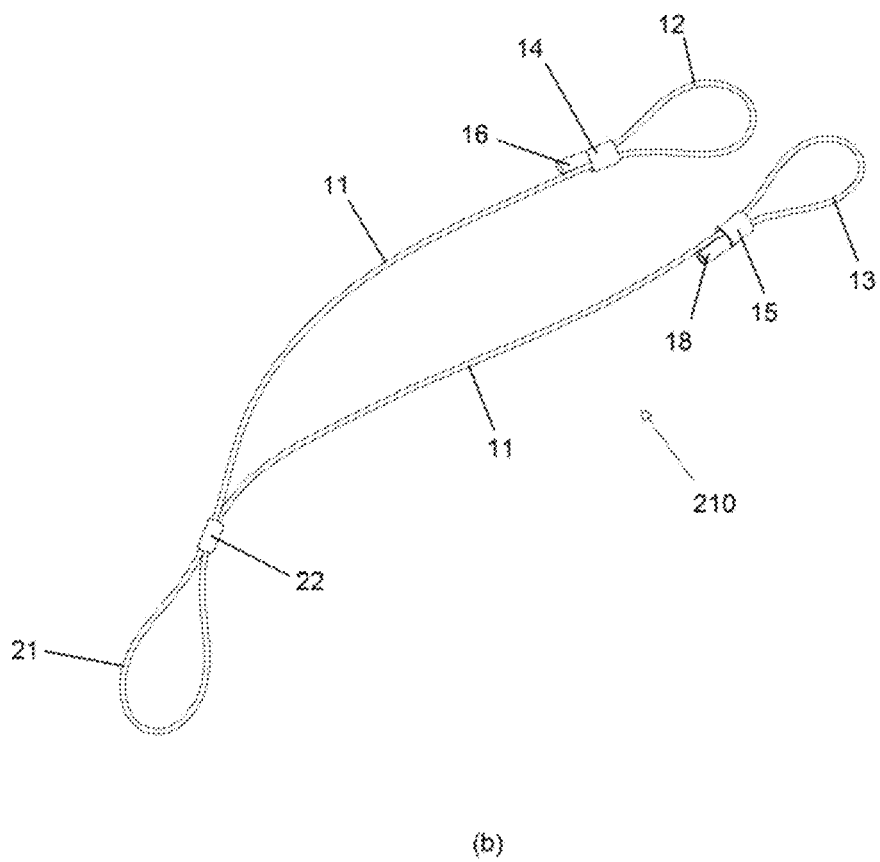
Figure 6A:
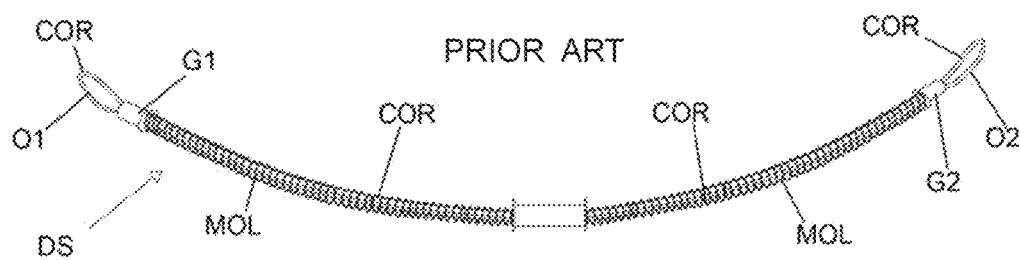
FIG. 6A is a photographic image of a flexible cable safety device, conforming to the prior art, for securing a connection subject to pressure and retain the respective parts in case of breaking and/or bursting of such connection.
Figure 6B:
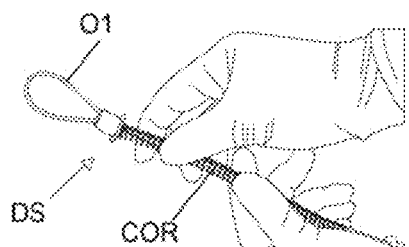
FIG. 6B, divided in sections (a)÷(h), are further photographic images that show the safety device of FIG. 6A, known, during use.
Figure 6B:
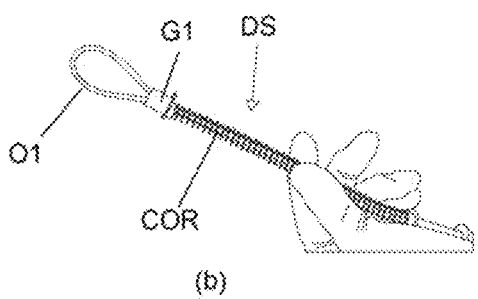
Figure 6B:
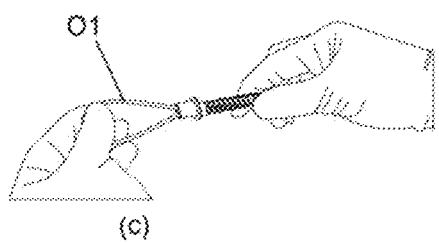
Figure 6B:
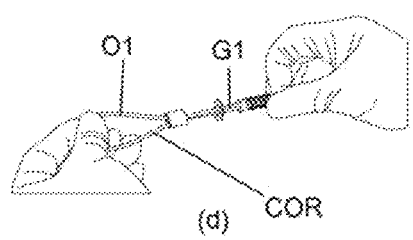
Figure 6B:
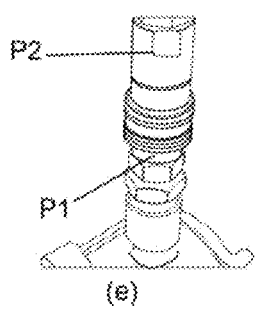
Figure 6B:
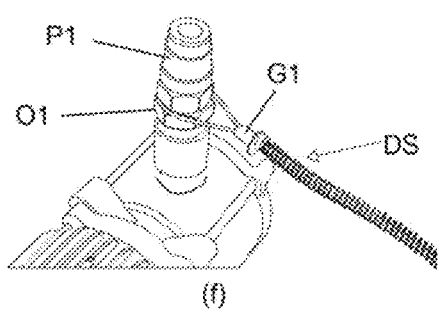
Figure 6B:
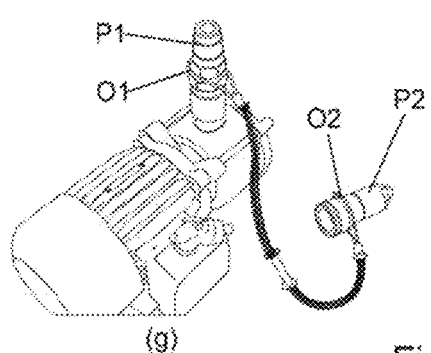
Figure 6B:
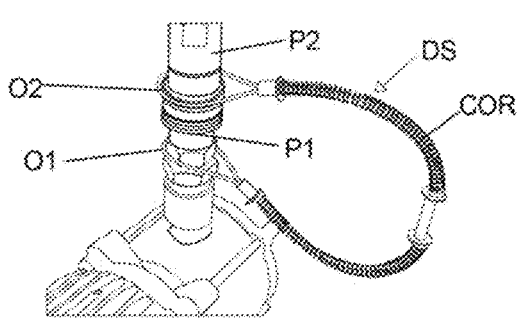

Still according to a further variant, designated by 210 and shown in FIG. 5H, the safety device can have, in addition to the two end eyelets 12 and 13, a further third intermediate eyelet, indicated with 21, which is formed, by means of a corresponding terminal 22, along the portion of the flexible cable 11 that extends between the first and the second end eyelet 12, 13, wherein this third eyelet 21 has the function of allowing to attach and connect the safety device 210 to a third party, in addition to those P1 and P2 to which there is possible to attach the two eyelets 12 and 13, of the pipeline and equipment under pressure to be secured.

Finally, according to another variant not shown in the drawings, the sleeves 14 and 15 which form the two eyelets, 12 and 13 respectively, of the safety device 10, and thereby receive two portions, folded on themselves, of the flexible cable 11, can be configured so as to allow the sliding, along each sleeve 14, 15, only of one of these two portions, folded on themselves, of the flexible cable 11.

In particular, in this variant, the sleeve 14 or 15, or both can be configured so as to be integral and thereby form a unique body with the corresponding terminals 16, 18 provided at the ends of the flexible cable 11, so as to block the latter at the ends and thereby allow the sliding, along each sleeve 14, 15, of only the central portion of the flexible cable 11 that extends between the sleeves 14 and 15.

Furthermore, it is noted that the operating context in which the sliding cable safety device the invention can be used and applied is not limited and restricted to that, described previously, in which the safety device is provided to intervene in order to absorb the energy and the stresses generated by the rupture or by a similar destructive event of a pipeline or a similar equipment under pressure, i.e. to retain for safety reasons the parts of the pipeline or equipment interested by the rupture, but it has to be considered much broader.

In particular, the safety device of the invention also appears capable to be advantageously used and applied in an operating environment in which it is subject to tensile stresses that are not the typical ones generated by the burst or rupture of a pipeline under pressure or by a similar event, and therefore to be associated, in order to offer the best safety conditions, with equipments that can also be different from a pipeline or an equipment under pressure.

For example the safety device may advantageously be attached to the lifting organ of a lifting or traction machine or apparatus, as the cable of a crane or an elevator, and therefore in this case be used to lift or drag loads using the same lifting or traction machine or apparatus.

The invention claimed is:

1. An installation securing a conduit, pipeline, piping, organ, system, machine or a similar equipment subject in the operation to high pressures due to a fluid under pressure, such as air, water, oil, steam, which circulates or in general operates in said conduit or similar equipment, comprising:
   a first part and a second part, connected between them, of the conduit or similar equipment, under pressure, secured by the installation; and
   a sliding cable safety device arranged between said first and said second part, connected between them, of the conduit or similar equipment under pressure,
   wherein said safety device in turn comprises:
   a flexible cable which has at least a first attachment eyelet and a second attachment eyelet formed respectively by two end portions of the flexible cable;
   at least a first sleeve and a second sleeve which close the two end portions of the flexible cable so as to form, at the two ends of the safety device, said first and second attachment eyelets; and
   two terminals provided at the opposite ends of the flexible cable included in the sliding cable safety device,
   wherein said first attachment eyelet and second attachment eyelet are attached respectively to such two parts, connected between them, of said conduits and similar equipment subject to high pressures, so as to retain by means of the safety device said two parts, in case of rupture, burst or in general of a fault in the connection zone of said first part and said second part of the conduit or similar equipment under pressure and secured by the installation;
   wherein the safety device is configured so that, when a rupture, a burst or in general a fault occurs in said connection zone, the flexible cable of the safety device is subject to slide in the two sleeves;
   wherein the two terminals, provided at the two opposite ends of the flexible cable, are spaced at a certain distance from the corresponding sleeves which form the two attachment eyelets at the two ends of the safety device,
   whereby, when a rupture, a breakage, a burst or in general a fault occurs in said connection zone of said two parts of the conduit or similar equipment under pressure secured by said installation, the flexible cable of the safety device slides in said first and second sleeve so as to recover and reduce said distance and consequently to push and move said terminals to stop against and cooperate into contact with said sleeves, thereby tightening the two eyelets, formed at the two ends of the safety device around said two parts, to which the same safety device is attached, of the conduit or similar equipment subject in the operation to high pressures;

and wherein at least one of said sleeves is calibrated, that is it is designed to tighten the flexible cable of the safety device with a determined calibrated tightening force, whereby, in case of intervention of the safety device following a rupture, a breakage, a burst or in general a fault in the connection zone of said two parts under pressure, the flexible cable of the safety device is subject to a sliding, in said at least one of said sleeves, which is controlled by said determined calibrated tightening force, and consequently also the damping and the dissipation by friction, by means of the safety device of the energy and the stresses that develop and are released in such events of rupture, breakage, burst or fault, are controlled by said determined calibrated tightening force.

2. The installation according to claim 1, wherein said first sleeve and second sleeve are both calibrated, so as to both close and tighten the flexible cable of the safety device with a respective determined calibrated tightening force.

3. The installation according to claim 1, wherein said flexible cable is of the metallic or non-metallic type and is realizable with a traditional rope, a tape or a string with any type of material, and in various sizes, in particular with a diameter comprised from 1 mm to 30 mm and more.

4. The installation according to claim 1, wherein said flexible cable has an outer covering or layer that covers externally the flexible cable and avoids any rubbing between the ferrous and metallic material of the flexible cable and the metal parts to which the safety device is attached, in use, at the ends with its eyelets, whereby the safety device is adapted to be applied, in accordance with regulations, in environments at risk of explosion.

5. The installation according to claim 1, wherein the two terminals are made of a material selected from a group of materials consisting of aluminium, steel, plastic, composite materials, and in various forms, in particular round, flat, oval.

6. The installation according to claim 1, wherein the flexible cable of said safety device is of the composite multilayer type with an inner metallic core, made of metal wires, and at least a layer, made of braided yarns of aramid fibers, formed around the inner metallic core.

7. The installation according to claim 1, wherein the safety device further comprises an additional attachment element, associated with said flexible cable, wherein said first attachment eyelet and second attachment eyelet are mounted and attached to a same part, of said two parts of said conduit or similar equipment under pressure, instead than respectively to them, and the flexible cable of said device is attached, by means of said additional attachment element, to the other part of said conduit, pipeline or similar equipment under pressure, along the portion of the flexible cable which extends between said two eyelets.

8. The installation according to claim 1, wherein said safety device further comprises at least a third intermediate attachment eyelet, in addition to said first and second attachment eyelets formed by the two end portions of the flexible cable, wherein said third intermediate attachment eyelet is formed, by a corresponding sleeve, along the portion of the flexible cable which extends between the first and second attachment eyelets and attaches and connects, in said connection zone of said two parts, the safety device to a third part of the conduit, pipeline or equipment in pressure secured by the installation.

9. A sliding cable safety device to secure conduits, pipes, pipelines, organs, systems, machines or similar equipments subject in the operation to high pressures because of a fluid under pressure, such as air, water, oil, steam which circulates or in general operates in said conduits and similar equipments, comprising:

a flexible cable which has at least a first attachment eyelet and a second attachment eyelet formed respectively by two end portions of the flexible cable; and at least a first sleeve and a second sleeve which close respectively the two end portions of the flexible cable on themselves so as to form, at the two ends of the safety device, said first and second attachment eyelets, wherein said first attachment eyelet and second attachment eyelet allow to attach and connect the safety device, at its two ends, to two parts, connected between them in a respective connection zone, of said conduits and similar equipments subject to high pressure, so as to retain by means of the safety device said two parts in the event of rupture, burst, explosion or in general of another fault in said connection zone;

wherein the safety device further comprises:

two terminals provided at the opposite ends of the flexible cable included in the safety device, and the safety device is configured so that, when a rupture, a burst or in general another fault occurs in said connection zone, the flexible cable of the safety device is subject to slide in the two sleeves, whereby the two terminals, provided at the opposite ends of the flexible cable, are forced to cooperate into contact with the first and the second sleeve, so as to tighten the two eyelets around the two parts, to which the safety device is attached, of said conduits and similar equipments subject in the operation to high pressures, and wherein said flexible cable is of the multilayer composite type with an inner metallic core, made of metal wires, and at least one layer, made of braided yarns of aramid fibers, formed around said inner metallic core.

10. The safety device according to claim 9, wherein said safety device is provided to be applied on said two parts, connected between them, of said conduits and similar equipments subject in the operation to high pressures, in a use configuration in which the two terminals, arranged at the two ends of the flexible cable, are spaced at a certain distance from the corresponding sleeves which form the two attachment eyelets at the two ends of the safety device whereby, when a rupture, a burst or in general a fault occurs in said connection zone, the flexible cable of the safety device slides in said first and second sleeve so as to recover and reduce said distance and consequently to push and move said terminals to stop against and cooperate into contact with said sleeves.

11. The safety device according to claim 9, wherein at least one of said sleeves is calibrated, that is it is designed to tighten the flexible cable of the safety device with a determined calibrated tightening force, whereby, in case of intervention of the safety device following a rupture, a breakage or in general a fault in the connection area between said two parts under pressure, the flexible cable of the safety device is subject, in said at least one of said sleeves, to a sliding which is controlled by said determined calibrated tightening force, and consequently also the damping and the dissipation, by means of the safety device, of the energy and the stresses that develop and are released in such event of rupture, breakage or fault are controlled by said determined calibrated tightening force.

12. The safety device according to claim 11, wherein said first sleeve and second sleeve are calibrated, so as to both close and tighten the flexible cable of the safety device with a respective determined calibrated tightening force.

13. The safety device according to claim 9, wherein said flexible cable is realizable in various sizes, in particular with a diameter comprised from 1 mm to 30 mm and more.

14. The safety device according to claim 9, wherein said flexible cable has an outer layer that covers externally the flexible cable and avoids any rubbing between the material of the flexible cable and metal parts to which the safety device is attached, in use, at the ends with its eyelets.

15. The safety device according to claim 9, wherein the two sleeves are made of a material selected from a group of materials consisting of aluminium, steel, plastic, composite materials, and in various forms, in particular round, flat, oval.

16. The safety device according to claim 9, further comprising an additional attachment element, associated with said flexible cable and adapted to allow to attach and connect the safety device to one of said two parts, connected between them, of the conduits, pipelines or similar equipments subject to high pressures,
wherein, in the use of said safety device, said first attachment eyelet and second attachment eyelet are mounted and attached to a same part of said conduit, pipeline or similar equipment in pressure, and the flexible cable of said device is attached, by means of said additional attachment element, to the other part of said conduit, pipeline or similar equipment under pressure, along the portion of the flexible cable which extends between said two eyelets.

17. The safety device according to claim 9, further comprising at least a third intermediate attachment eyelet, in addition to said first and second attachment eyelets formed by the two end portions of the flexible cable, wherein said third intermediate attachment eyelet is formed, by a corresponding sleeve, along the portion of the flexible cable which extends between the two end eyelets and has the function of allowing to attach and connect, in said connection zone, the safety device to a third part of the conduit, pipeline and equipment in pressure to be secured.

18. An installation securing conduits, pipelines, piping, organs, systems, machines or similar equipments subject in the operation to high pressures due to a fluid under pressure, such as air, water, oil, steam, which circulates or in general operates in said conduits and similar equipments, comprising:
a first part and a second part, connected between them, of the conduit or similar equipment secured by means of the same installation,
a safety device according to claim 9, for connecting a first part and a second part, connected between them in a respective connection zone, of the conduit or similar equipment to be secured by means of the same installation,
wherein the first attachment eyelet and the second attachment eyelet, provided at the ends of the safety device, are attached respectively to said firs and to said second part of the conduit or similar equipment subject to high pressures and secured by the installation.

19. A method for securing conduits, pipelines, piping, organs, systems, machines or similar equipments subject in the operation to high pressures due to a pressurized fluid, such as air, water, oil, steam which circulates or in general operates in said conduits or similar equipments, comprising the following steps:
providing a sliding cable safety device comprising:
a flexible cable having a first attachment eyelet and a second attachment eyelet formed respectively by two end portions of the flexible cable;
a first sleeve and a second sleeve which close respectively the two end portions of the flexible cable so as to form, at the two ends of the safety device said first and second attachment eyelets; and
two terminals provided at the opposite ends of the flexible cable which is included in the safety device; and
attaching and connecting the safety device at its two ends, using said eyelets, to two parts, connected between them, of the conduit or similar equipment, subject to high pressure, to be secured, so as to retain by means of the safety device said two parts in case of rupture, burst or in general of a fault in the connection zone between them;
wherein the method further comprises, before the step of attaching and connecting the safety device to the two parts, connected between them, of the conduit or similar equipment to be secured, a preliminary step of adapting and configuring the flexible cable of the safety device in a configuration in which the two terminals, provided at the opposite ends of the flexible cable, are spaced at a certain distance from the corresponding sleeves which close the two attachment eyelets of the safety device,
whereby, when a rupture, a burst or in general a fault occurs in said connection zone of said two parts of the conduit or similar equipment under pressure secured by said safety device, the flexible cable of the safety device slides in said first and second sleeve in such a way to recover said distance and consequently to push and move said terminals, provided at the opposite ends of the flexible cable, to stop against and cooperate into contact with said sleeves, so as to tighten the two eyelets, formed at the two ends of the safety device, around the two parts, to which the same safety device is attached, of said conduit or similar equipment subject in the operation to high pressure.

20. The method according to claim 19, wherein at least one of said sleeves of the sliding cable safety device is calibrated, that is it is designed to tighten the flexible cable of the safety device with a determined calibrated tightening force,
whereby, when a rupture, a burst or in general a fault occurs in said connection zone, the sliding of the flexible cable of the safety device, in said at least one of said sleeves, is controlled by said determined calibrated tightening force, with the effect that the damping and the dissipation by friction, by means of the safety device, of the energy and the stresses that develop and are released in such events of rupture, breakage or fault, are controlled by said determined calibrated tightening force.

* * * * *